US007681795B2

(12) United States Patent
Roquemore (10) Patent No.: US 7,681,795 B2
(45) Date of Patent: Mar. 23, 2010

(54) METHODS AND APPARATUS FOR A SCANNER HAVING A TOP PLATE ASSEMBLY WITH WEIGHT MEASUREMENT CAPABILITIES

(75) Inventor: Pete Roquemore, Snellville, GA (US)

(73) Assignee: NCR Corporation, Dayton, OH (US)

( * ) Notice: Subject to any disclaimer, the term of this patent is extended or adjusted under 35 U.S.C. 154(b) by 854 days.

(21) Appl. No.: 11/277,531

(22) Filed: Mar. 27, 2006

(65) Prior Publication Data

US 2007/0221733 A1    Sep. 27, 2007

(51) Int. Cl.
 *G06K 7/10* (2006.01)
(52) U.S. Cl. .............................. 235/462.01; 235/462.43; 235/383; 235/379
(58) Field of Classification Search ................. 235/379, 235/383, 384, 385, 462.01, 462.13, 462.43, 235/462.46
 See application file for complete search history.

(56) References Cited

U.S. PATENT DOCUMENTS 7,051,922 B2 * 5/2006 Check et al. ........... 235/462.32

* cited by examiner

*Primary Examiner*—Karl D. Frech
(74) *Attorney, Agent, or Firm*—Priest & Goldstein PLLC; Harden E. Stevens, III (57) ABSTRACT

Systems and techniques for a scanner having a top plate with an integrated scale. A scanner base mates with a scanner top plate assembly, with the top plate assembly including an integrated scale. The top plate assembly includes a scan window and a scale mechanism. The top plate rests on or is secured to suitable resting points in the scanner base. The top plate suitably receives power, and communicates measurement data to the scanner base, without the use of cables or other connectors whose weight may interfere with accurate reading of weight. A scanner base may be designed so as to accommodate any of a variety of alternative scanner top plate types without reconfiguration, or with a relatively simple reconfiguration of the scanner base.

20 Claims, 11 Drawing Sheets

METHODS AND APPARATUS FOR A SCANNER HAVING A TOP PLATE ASSEMBLY WITH WEIGHT MEASUREMENT CAPABILITIES

FIELD OF THE INVENTION

The present invention relates generally to improvements to retail scanner scale systems. More particularly, the invention relates to improved systems and techniques for performing weight measurement using a top plate assembly for a scanner scale system and communicating weight measurements to the scanner base without attachments that risk affecting weight readings.

BACKGROUND OF THE INVENTION

Present day retail systems frequently employ bar code scanner scale systems. Scanner scale systems typically include scale hardware deployed in the scanner base. Such integration of scale hardware imposes significant constraints on design of scanner scale systems. The scanner base must provide physical space for the scale components, and the enclosure and mechanical elements of the scanner base must be constructed so as to support the scale weighing plate and any loads that may be placed on the weighing plate. The physical space needed for the scale components imposes size requirements on a scanner in order to accommodate the scale components and the optical paths required to generate scan beams and for reflected light directed into the scanner for processing. In addition, the integration of scale components into the scanner base, as required by prior art techniques, limits the flexibility of scanner designs. Not all customers using console scanners need scale features. However, if scale capability is integrated into the base of a scanner, it is difficult or impossible to provide a single design that can be modified in order to be sold with or without scale capability.

SUMMARY OF THE INVENTION

Among its several aspects, the present invention addresses such difficulties by providing for a scanner top plate assembly with an integrated scale, and a scanner base suitable for mating with the top plate assembly. The top plate assembly includes a scan window and a measuring device, such as one or more load cells or strain gauges. The top plate assembly rests on or is secured to suitable resting points in the scanner base. The top plate assembly suitably receives power, and communicates measurement data to the scanner base, without the use of cables or other connectors whose weight may interfere with accurate reading of weight. A scanner base may be designed so as to accommodate any of a variety of alternative scanner top plate assemblies without reconfiguration, or with relatively simple reconfiguration of the scanner base.

A more complete understanding of the present invention, as well as further features and advantages of the invention, will be apparent from the following Detailed Description and the accompanying drawings.

DETAILED DESCRIPTION

Figure 1A:
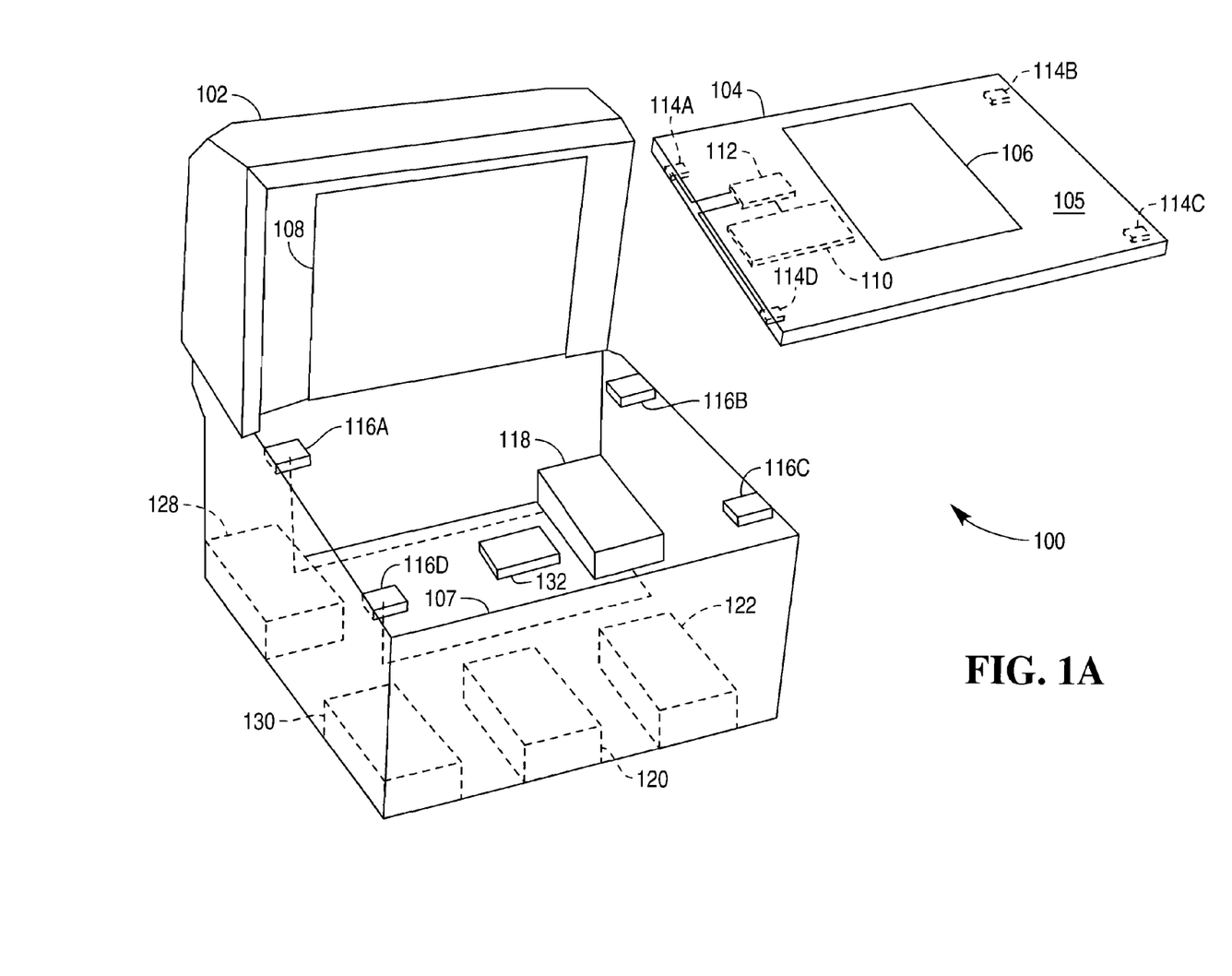
FIGS. 1A-1E illustrate various alternative combinations of a scanner top plate assembly and a scanner base according to aspects of the present invention.

FIG. 1A illustrates a scanner 100 according to an aspect of the present invention. The scanner 100 includes a scanner base 102 and a scanner top plate assembly 104. The scanner top plate assembly 104 is removable from the scanner base 102, and the scanner base 102 and scanner top plate assembly 104 are shown here as separated from one another for clarity of illustration and to afford a view into the scanner base 102. The scanner top plate assembly 104 includes a generally flat top plate 105 on which objects may be placed for weighing, and in which a horizontal scan window 106 is disposed. The scanner base 102 includes a housing 107 and a vertical scan window 108. The scanner top plate assembly 104 houses a scale mechanism 110 in the interior of the scanner top plate assembly 104, as well as a scale support unit 112 for conditioning power for the scale mechanism 110 and controlling and providing communications to and from the scale mechanism 110. The scanner top plate assembly 104 includes four rest points 114A-114D for resting the scanner top plate assembly on four corresponding support points 116A-116D of the scanner base 102. In the example illustrated here, the support point 114A and the rest point 116A conduct electrical power to the scale support unit 112, which in turn supplies necessary power to the scale mechanism 110. The rest point 114D and the support point 116D provide a communication pathway between the scale support unit 112 of the scanner top plate assembly 104 and a top plate assembly control and communication interface 118 in the scanner base 102.

In addition to the top plate assembly control and communication interface 118, the scanner base 102 also includes conventional optical elements for generating one or more scan patterns and directing light that is reflected back into the scanner, in order to extract bar code information. These elements are not shown here in the interest of simplicity and to avoid obscuring the elements used to achieve support and communication with the top plate assembly 104. The scanner base 102 also includes a bar code processing unit 120 for processing signals generated by reflection of scan patterns from bar codes, in order to extract bar code information, as well as a terminal interface unit 122 for managing communications with a transaction processing terminal with which the scanner 100 may be used.

The top plate assembly control and scale support interface 118 exercises such control as is needed over the operation of the scale support unit 112 and the scale mechanism 110, and receives and processes weight signals received from the scale support unit 112. Control may include requesting activation or deactivation of the scale mechanism 110, requesting that the weight reading be in one format or another, or any other control desired.

The scanner base 102 may also include a wireless power transmission unit 128 and a wireless scale communication interface 130. The wireless power transmission unit 128 and the wireless scale communication interface 130 are optional and their presence or absence, and their specific design and configuration, depends on design choices made for the scanner base 102 and the scanner top plate assembly 104. Details of various possible wireless power transmission units 128 and wireless scale communication interfaces 130, as well as additional details of the top plate assembly control and communication interface 118, are discussed below. The scanner base 102 may also suitably include a light emitting diode (LED) 132, in order to provide a light source for powering top plate assemblies with onboard solar cells. Such top plate assemblies are discussed further below.

Figure 1B:
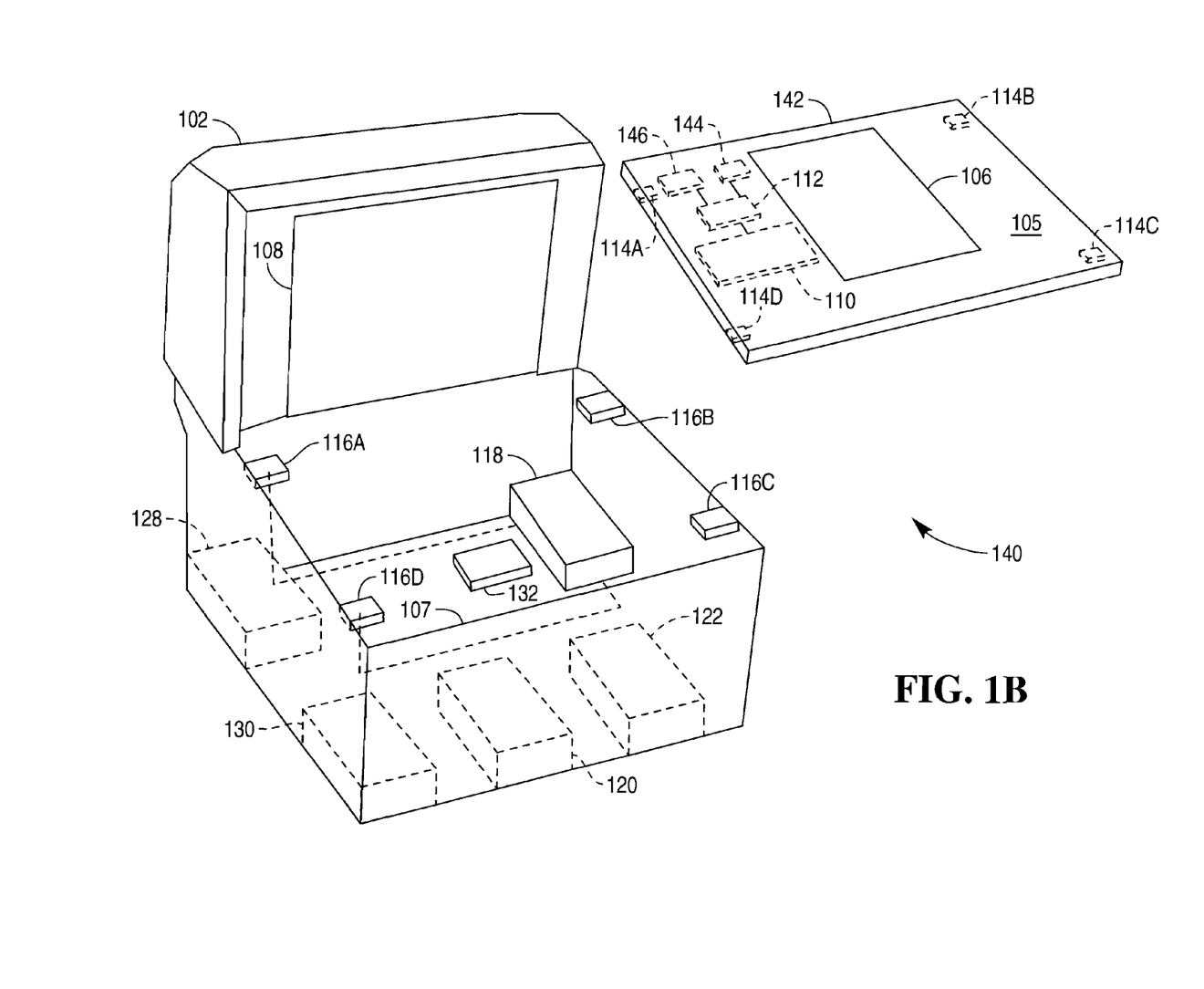

FIG. 1B illustrates an alternative scanner 140, combining the scanner base 102 with an alternative scanner top plate assembly 142. The various elements 107, 108, 116A-116D, 118, 120, 122, 128, 130 and 132 are all illustrated here, because the scanner base 102 may suitably include all elements necessary to communicate with a number of different top plate assemblies, to simplify the process of interchanging top plate assemblies.

The top plate assembly 142 includes the top plate 105, the window 106, the scale mechanism 110, the scale support unit 112 and the rest points 114A-114D. However, the top plate assembly 142 does not include wired connections between the scale support unit 112 and the rest points 114A and 114D. Instead, the top plate assembly includes an onboard battery 144 and a wireless communication unit 146. The onboard battery 144 powers the scale mechanism 110 and the scale support unit 112 independently of the scanner base 102. The wireless communication unit 146 communicates with the wireless scale communication interface 130. The exemplary wireless communication unit 146 illustrated here is an infrared communication device. As will be seen by the additional examples discussed below, various alternative power elements and communication devices may be used in various implementations of a top plate assembly, and the scanner base 102 may suitably support any of the different alternatives to simplify interchangeability. For example, the wireless communication unit 146 may be replaced by a radiofrequency device as illustrated in FIG. 1C, a device employing reflected backscatter of radiofrequency transmissions, a BLUETOOTH® communication device, a device employing inductive coupling as illustrated in FIG. 1D, or any of a number of alternative devices and techniques.

Figure 1C:
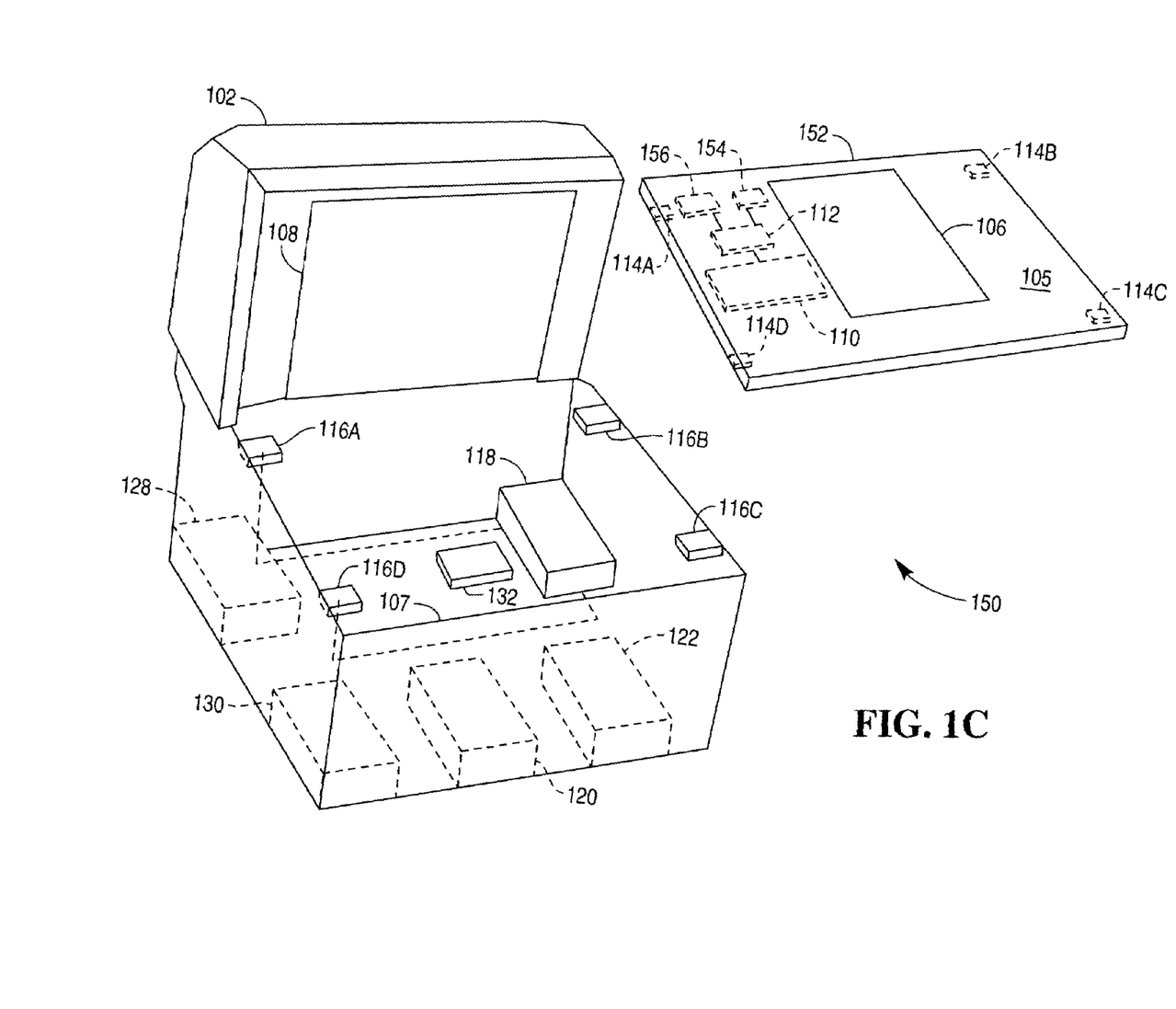
Figure 1D:
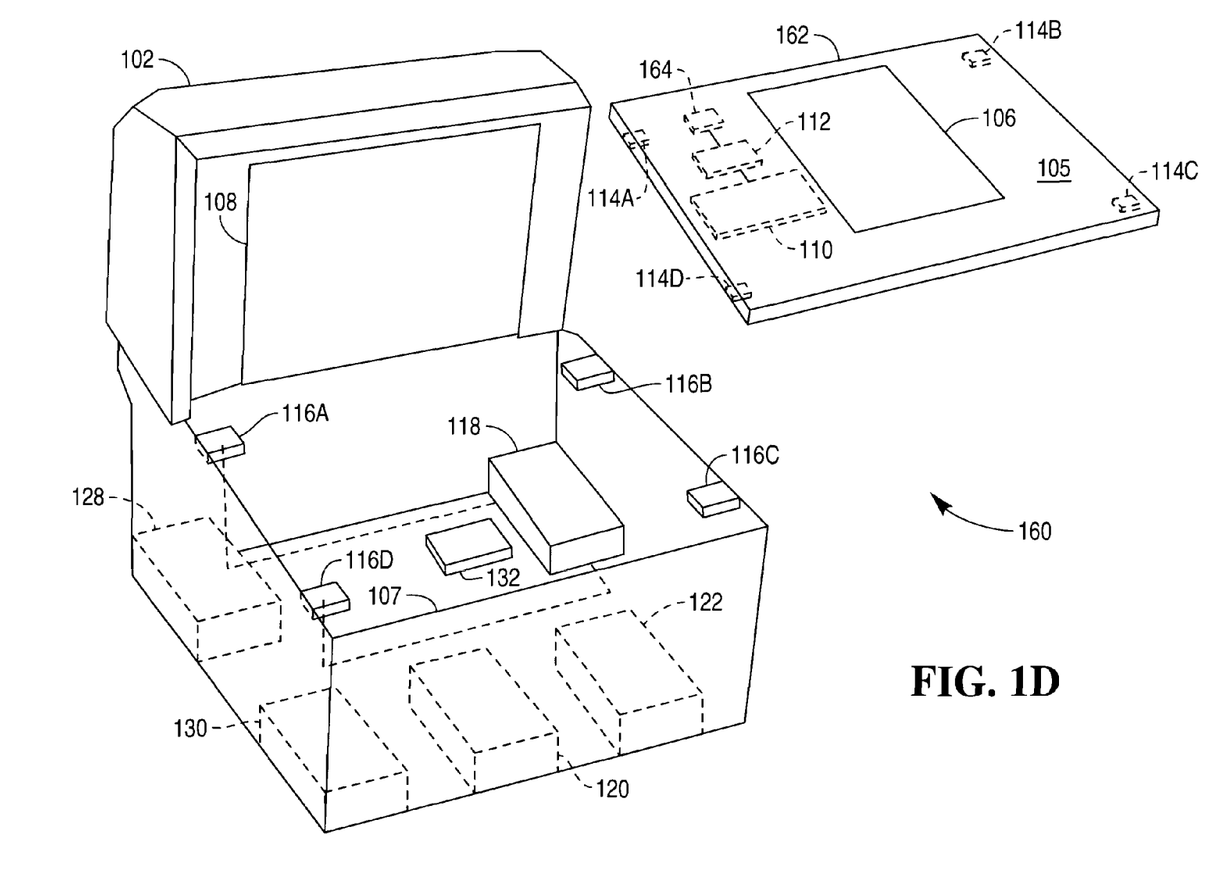

FIG. 1C illustrates an alternative scanner 150, combining the scanner base 102 with an alternative scanner top plate assembly 152. The various elements 102, 107, 108, 116A-116D, 118, 120, 122, 128, 130 and 132 are all illustrated here.

The top plate assembly 152 includes the top plate 105, the window 106, the scale mechanism 110, the scale support unit 112 and the rest points 114A-114D. However, the top plate assembly 152 does not include wired connections between the scale support unit 112 and the rest points 114A and 114D. Instead, the top plate assembly includes a solar cell 154 and a wireless communication unit 156. The solar cell 154 powers the scale mechanism 110 and the scale support unit 112. Depending on the specific implementation of the top plate assembly 152, the solar cell 154 may receive light from the LED in the scanner base 102, or from an ambient light source, such as the lights of an establishment in which the scanner 150 is used.

The wireless communication unit 156 communicates with the wireless scale communication interface 130. In the example illustrated here, the wireless communication unit is a radiofrequency (RF) device. It will be recognized, however, that numerous different alternative combinations of power elements and wireless communication elements may be used, and the various combinations in the examples of 1A-1D are exemplary.

FIG. 1D illustrates an alternative scanner 160, combining the scanner base 102 with an alternative scanner top plate assembly 162. The various elements 102, 107, 108, 116A-116D, 118, 120, 122, 128, 130 and 132 are all illustrated here.

The top plate assembly 162 includes the top plate 105, the window 106, the scale mechanism 110, the scale support unit 112 and the rest points 114A-114D. However, the top plate assembly 162 does not include wired connections between the scale support unit 112 and the rest points 114A and 114D. Instead, the top plate assembly 162 includes an inductive coupling unit 164 for receiving power from and performing communication through inductive coupling with a mating inductive coupling device provided in the wireless power transmission unit 128 of the scanner base 102. While an inductive coupling unit 164 is illustrated here as providing both power and communication, it will be recognized that an inductive coupling may be used for power only, with a separate device employing different techniques being used for communication. Alternatively, two separate inductive coupling units may be used. Furthermore, if desired, an inductive coupling unit may be used for communication while a different technique is used for power.

Figure 1E:
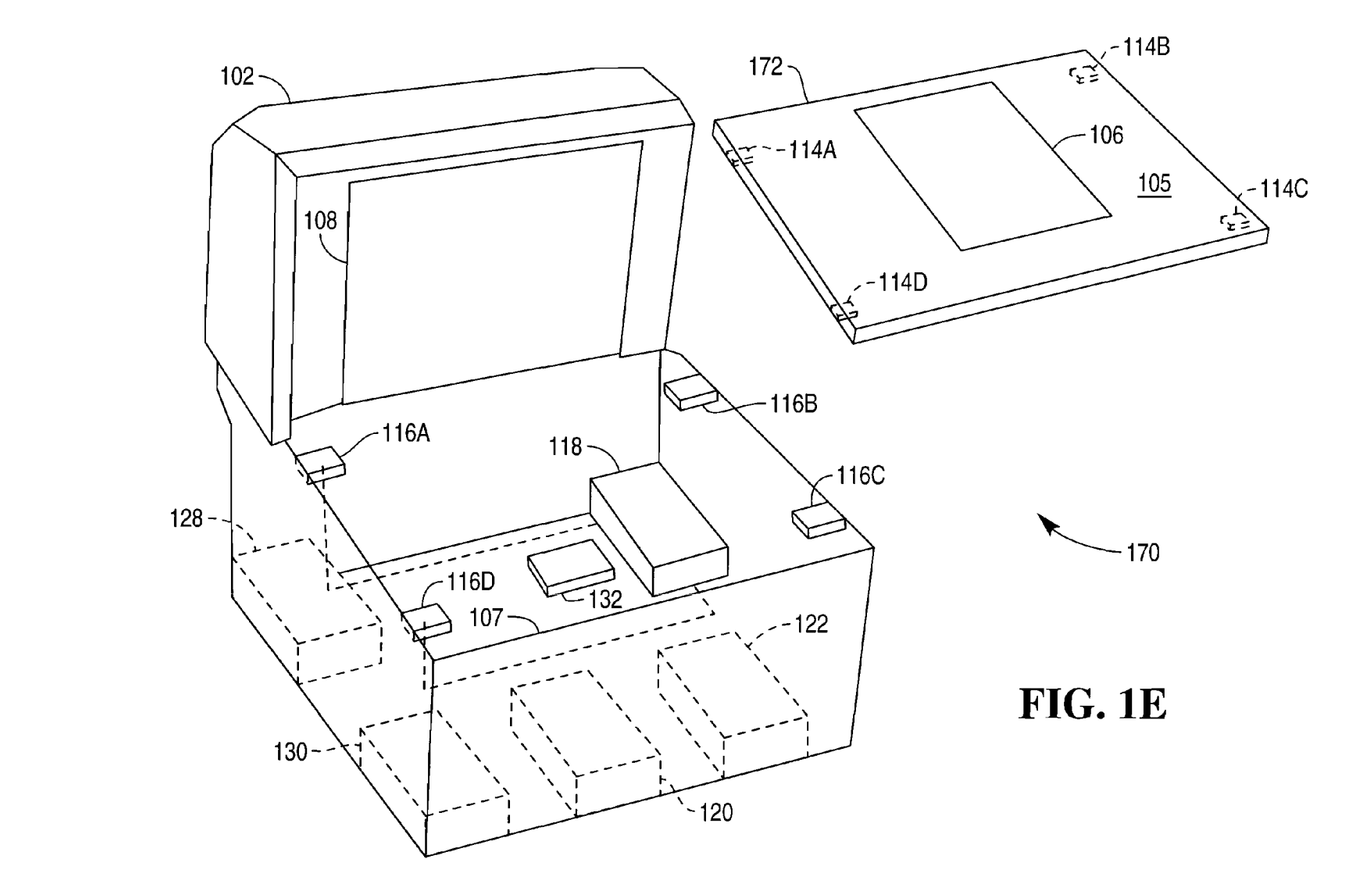

FIG. 1E illustrates a further alternative scanner 170, combining the scanner base 102 with an alternative scanner top plate assembly 172. The various elements 102, 107, 108, 116A-116D, 118, 120, 122, 128, 130 and 132 are all illustrated here.

In the present example, however, the top plate assembly 172 does not include any scale capabilities, and simply includes the top plate 105 and the window 106. The scanner 170 can be supplied to a customer who does not need scale capabilities and can be expected to carry a lower cost than a scanner with scale capabilities.

Figure 2A:
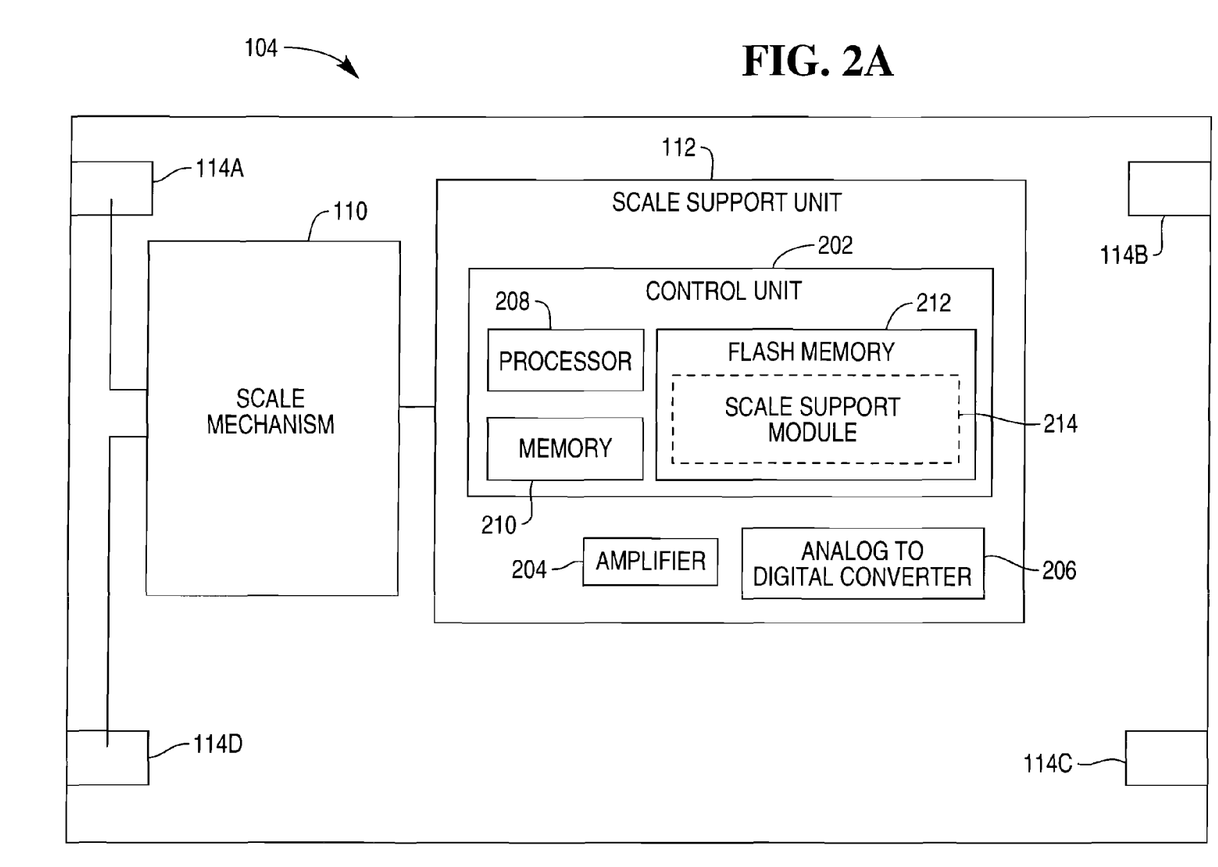
FIGS. 2A-2D illustrate additional details of various scanner top plate assemblies according to aspects of the present invention.

FIG. 2A is a diagram of the scanner top plate assembly 104, showing the various elements of the scanner top plate assembly 104 in block form. The scanner top plate assembly 104 includes the scale mechanism 110, suitably implemented as a load cell. A load cell is a set of strain gauges, typically arranged in a bridge configuration. However, any number of alternative implementations may be employed and the particular implementation used for the scale mechanism 110 does not affect the use of the invention. The scale mechanism 110 suitably generates an analog weight signal. This signal may be supplied directly to the scanner base 102 through a rest point connection, such as the contact of the rest point 114D and the support point 116D, but may alternatively be amplified, converted to digital format or otherwise processed for use by the scanner base 102. In addition, as discussed further above and below, this information may be wirelessly transmitted from the scanner top plate 104 to the scanner base 102.

The scanner top plate assembly 104 also includes the scale support unit 112. It will be recognized, however, that a scanner top plate assembly may be designed so that the scale mechanism simply provides an analog weight signal available at all times for interpretation and use by the scanner base 102.

In the example illustrated here, the scale support unit 112 includes a control unit 202, an amplifier 204 and an analog to digital converter 206. The control unit 202 receives and acts on commands received from the scanner base 102 and directs the operation of the scale support unit 112 and the scale mechanism 110. The amplifier 204 amplifies an analog signal produced by the scale mechanism 110 and the analog to digital converter 206 receives the amplified analog signal and generates a digital weight signal. The scale support unit 112 also controls power to the scale mechanism 110, typically based on commands received from the scanner base 102. If power conservation is desired, the scale support unit 112 may supply power to the scale mechanism 110, or to the amplifier 204 within the scale support unit, only when weight information is desired. In such a case, the scanner base 102 requests a weight reading and the scale support unit 112 powers up any necessary elements. Once the weight reading has been received, the scanner base 102 indicates that the reading is no longer needed, and the scale support unit 112 removes power. The scale support unit 112 may include a processor 208, which may be a low cost limited function processor having sufficient capability to perform a limited set of operations such as are necessary to respond to queries and commands from the scanner base 102, to direct operation of the scale mechanism 110, and to format weight signals as necessary and supply the weight signals to the scanner base 102.

The scale support unit 112 may also suitably include high speed memory 210 and relatively long term storage, here implemented as flash memory 212. The scale support unit 112 suitably operates under the control of a scale support module 216, suitably hosted in the flash memory 212 and transferred to high speed memory 210 as needed for execution by the processor 208. The scale support module 214 may suitably be the only program executed by the processor 208, and therefore may be transferred to high speed memory 210 at initialization of the scanner 100 and remain there during operation. The scale support module 214 performs all functions needed for managing operation of the scale mechanism 110, responding to queries and commands from the scanner base 102 and formatting weight readings and supplying the weight readings to the scanner base 102.

The scale support module 214 also manages communication with the scanner base 102 and power to the scanner support unit 112 and scanner mechanism 110. The scale support module 214 also provides identification information to the scanner base 102. The scanner top plate assembly 104 may be one of a variety of different types of scanner top plate assemblies that may be used interchangeably with a single scanner base such as the scanner base 102. At installation or at other suitable times, such as at each initialization of the scanner 100, the scale support module 214 conveys identification information to the scanner base 102 in order to identify the scanner top plate assembly as belonging to a specified type. The scanner base 102 then configures its operation so as to communicate properly with the particular type of scanner top plate assembly that is installed. Further details of this configuration, and choices that may be made in configuration, are discussed in greater detail below.

The wired connection for power through the rest point 114A of the top plate assembly 104 and the support point 116A of the scanner base 102, and for communication through the rest point 114D of the top plate assembly 104 and the support point 116D of the scanner base 102, as illustrated in FIG. 1A and FIG. 2A, is capable of providing necessary power to the elements in the top plate assembly 104 without a need for a cable connection to the top plate assembly 104. Use of a cable connection to the top plate assembly 104 would call for considerable caution in order to prevent unpredictable influences of the weight of any cabling on weight readings generated by the scale mechanism. Supplying power and communication through the illustrated contact avoids introducing any unpredictable weight influences.

Figure 2B:
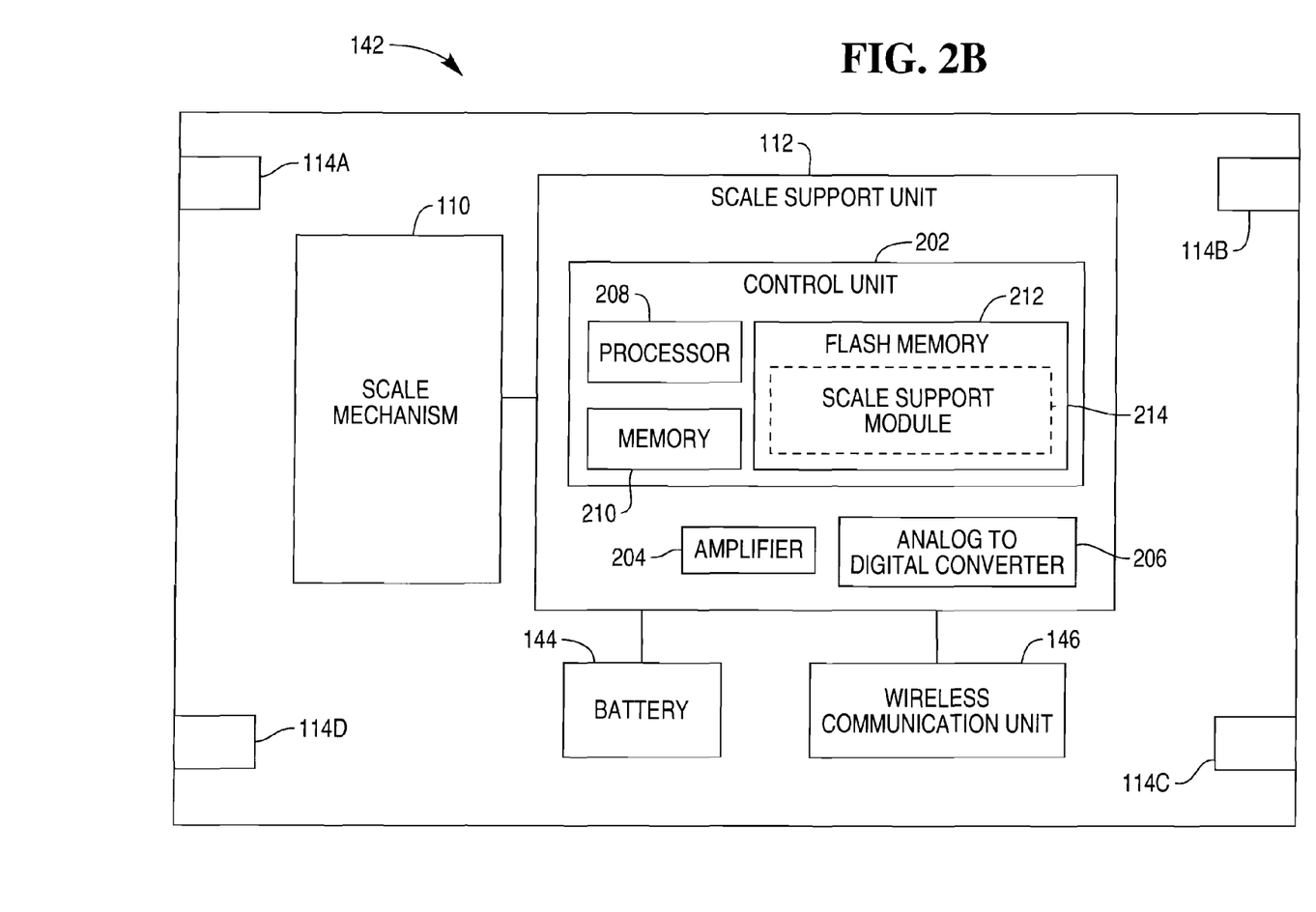

FIG. 2B is a diagram of the scanner top plate assembly 142 of FIG. 1B, showing the various elements of the scanner top plate assembly 142 in block form. The scale mechanism 110, the scale support unit 112, the rest points 114A-114D and the various elements 202-214 are shown here. In addition, the battery 144 and the wireless communication unit 146 are shown. The battery 144 and the wireless communication unit 146 provide power and communication through stable mechanisms, free of unpredictable weight influences. The wireless communication unit 146 receives commands and queries from the scanner base 102 and conveys the commands and queries to the scale support unit 112. In turn, the wireless communication unit receives responses and weight readings from the scale support unit 112 and transmits the responses and weight readings to the scanner base 102, in communication with the wireless scale communication interface 130 of the scanner base 102.

Figure 2C:
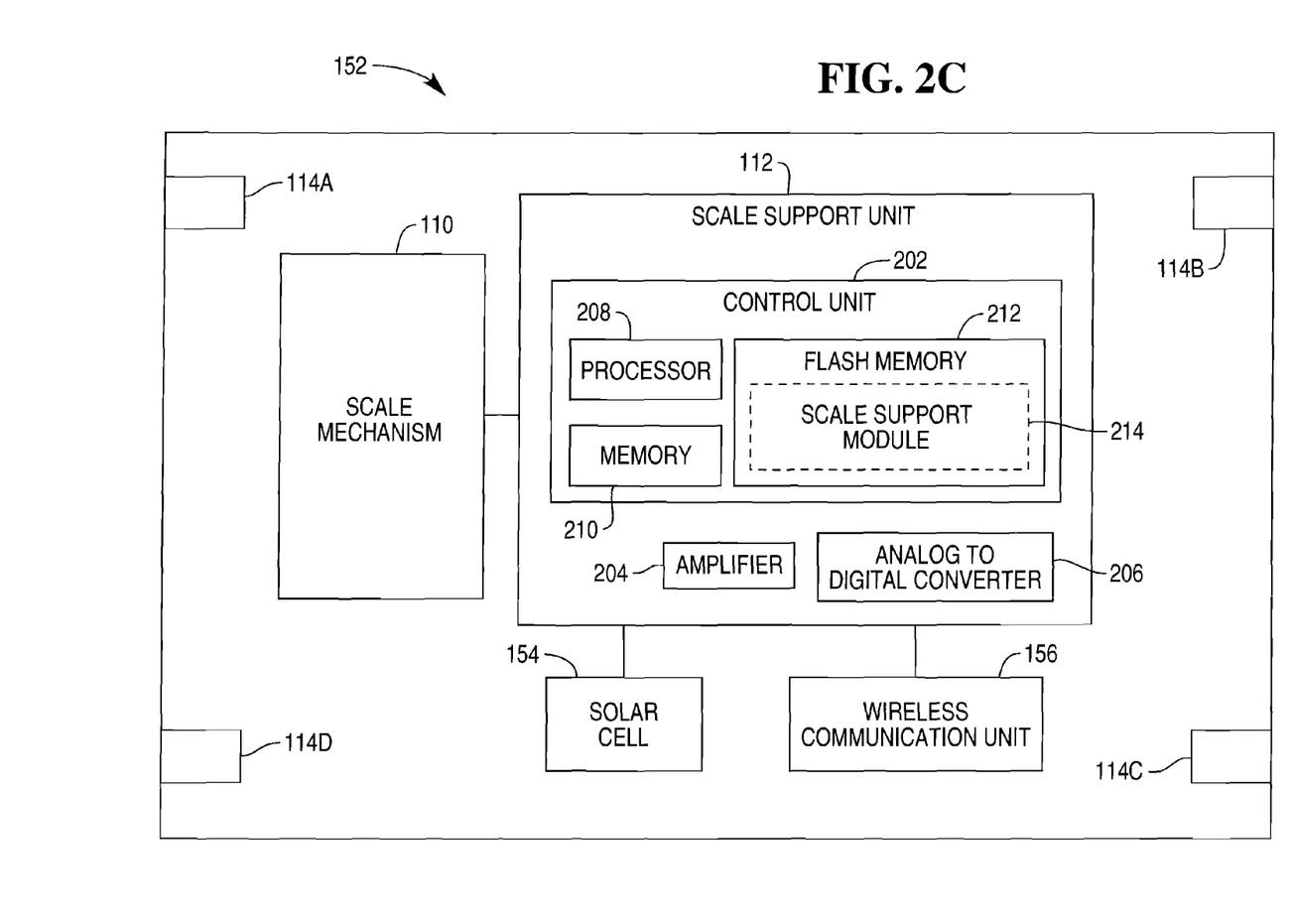

FIG. 2C is a diagram of the scanner top plate assembly 152 of FIG. 1C, showing the various elements of the scanner top plate assembly 152 in block form. The scale mechanism 110, the scale support unit 112, the rest points 114A-114D and the various elements 202-214 are shown here. In addition, the solar cell 154 and the wireless communication unit 156 are shown.

Figure 2D:
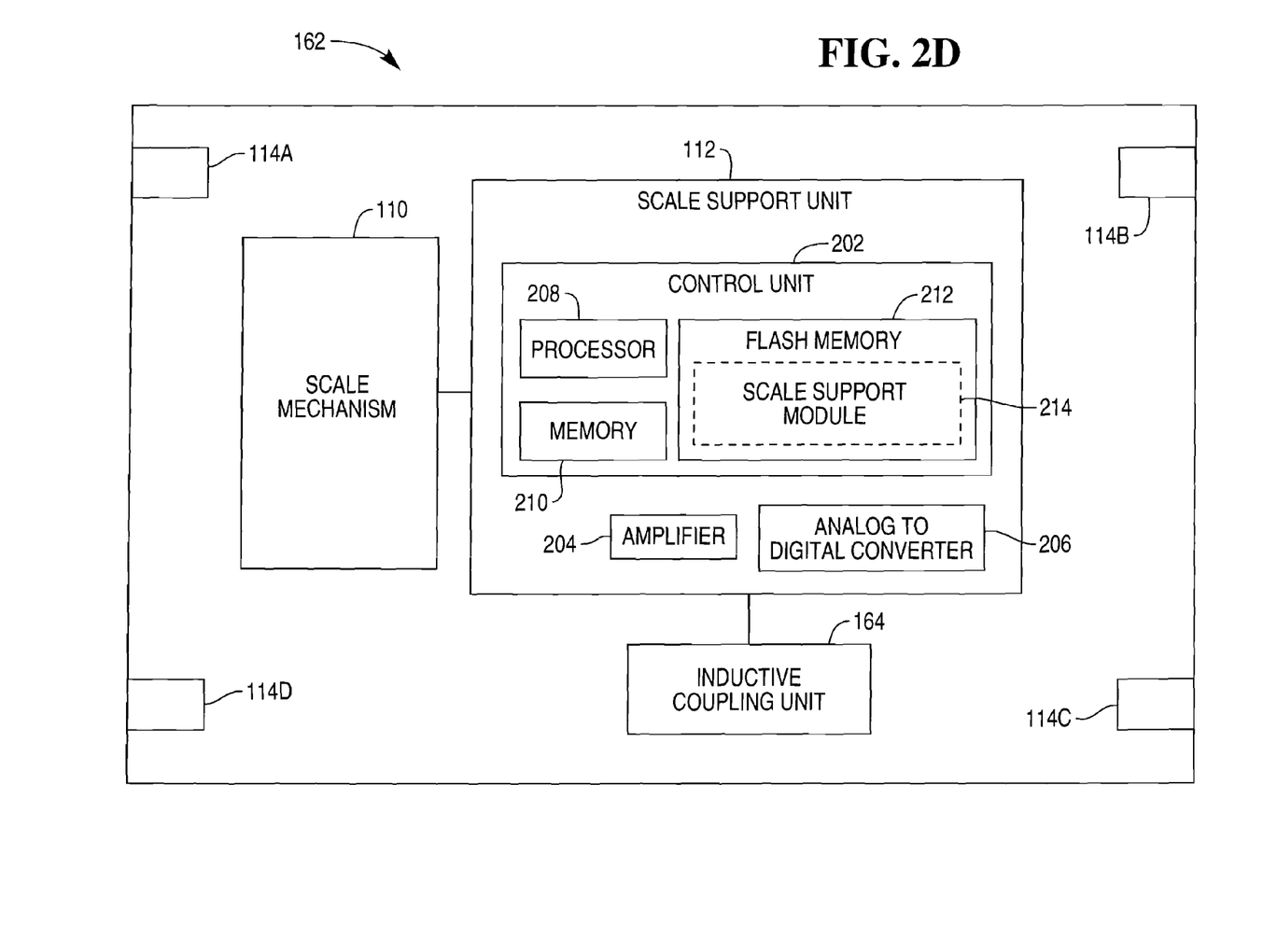

FIG. 2D is a diagram of the scanner top plate assembly 162 of FIG. 1D, showing the various elements of the scanner top plate assembly 162 in block form. The scale mechanism 110, the scale support unit 112, the rest points 114A-114D and the various elements 202-214 are shown here. In addition, the inductive coupling unit 164 is shown. As discussed above, the inductive coupling unit supplies power and communication through an inductive link with a mating element in the scanner base 102.

Figure 3:
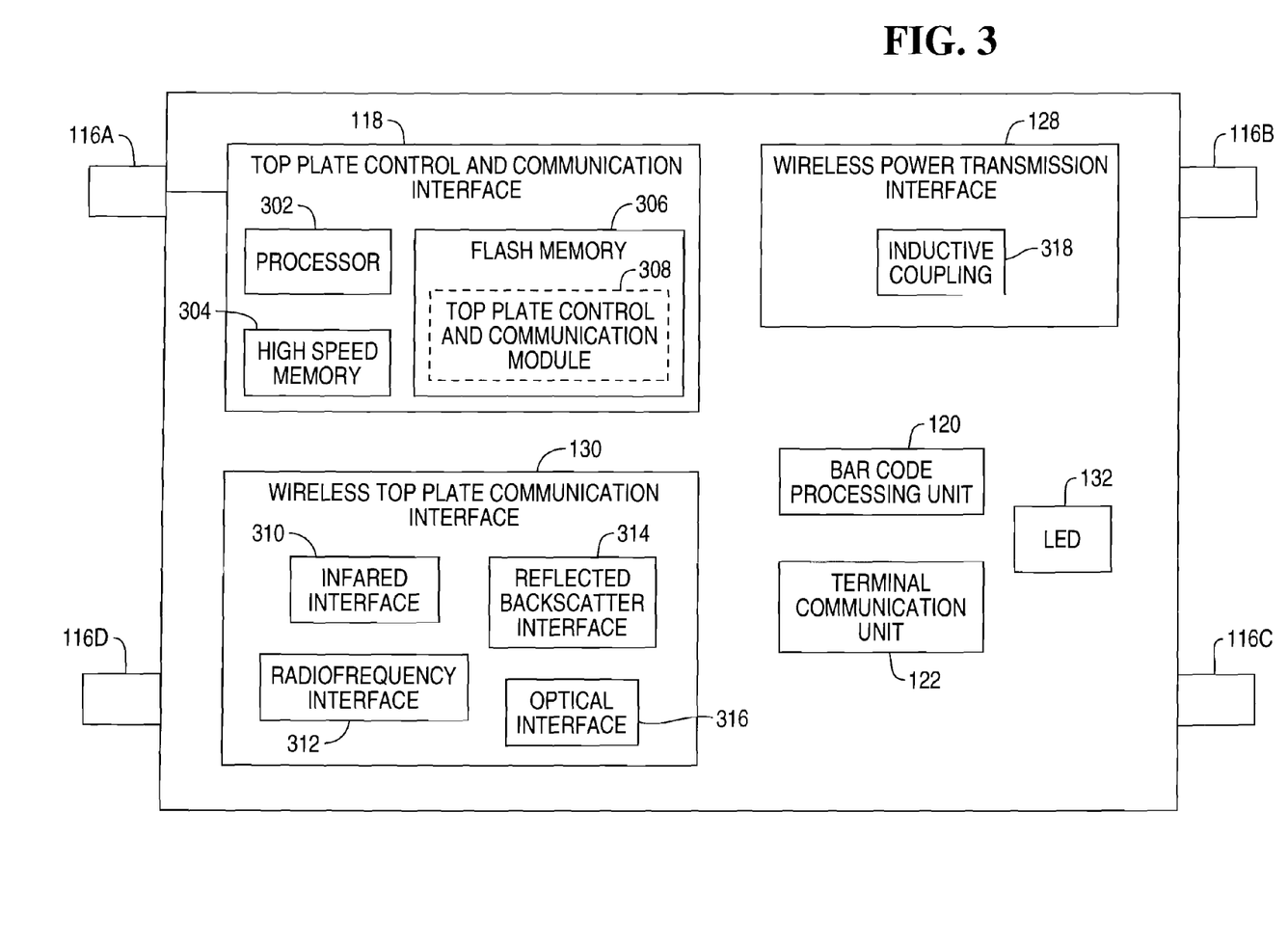
FIG. 3 illustrates additional details of a scanner base according to an aspect of the present invention.

FIG. 3 is a diagram of the scanner base 102, showing various elements of the scanner base 102 in block form. The scanner base 102 includes the top plate assembly control and communication interface 118, the wireless power transmission interface 128 and the wireless scale communication interface 130. The top plate assembly control and communication interface 118 includes a processor 302, high speed memory 304 and relatively long term storage such as a flash memory 306. The top plate assembly control and communication interface 118 operates under the control of a top plate assembly control and communication module 308, suitably implemented as software stored in the flash memory 306 and transferred to high speed memory 304 for execution by the processor 302 when needed. The top plate assembly control and communication interface 118 is shown here as comprising elements independent from elements performing other data processing, such as the bar code processing unit 120 and the terminal communication unit 122, but it will be recognized that the top plate assembly control and communication interface 118 need not be a distinct element and that its functions may be performed as a subset of the functions performed by other elements of the scanner base 102.

The top plate assembly control and communication interface 118 is able to communicate with a scanner top plate assembly such as the scanner top plate assembly 104 through a wired connection to the support point 116D, which makes contact with the rest point 114D of the top plate assembly 104. Additionally or as an alternative, the top plate assembly control and communication interface 118 is able to communicate through the wireless scale communication interface 130. In order to accommodate various different types of top plate assemblies, the wireless scale communication interface 130 suitably includes an infrared interface 310, a radiofrequency interface 312, a reflected backscatter interface 314 and an optical interface 316. As noted above, the scanner base 102 also includes the wireless power transmission interface 128, suitably implemented as an inductive coupling 318 mating with a similar coupling in the top plate assembly 104, when such a coupling is used to implement the power element 216 of the top plate assembly 104. If the power element 216 is implemented as a suitably designed inductive coupling, the wireless power transmission interface 128 may be used to carry out communication through magnetic induction. The scanner base 102 also includes a light source, such as the light emitting diode (LED) 132, used to provide light to a top plate assembly whose scale mechanism and support electronics are powered by a solar cell.

A scanner top plate assembly such as the top plate assembly 104 is mated to the scanner base 102 by placing the top plate assembly 104 on the base 102, suitably aligning the rest points 114A-114D with the support points 116A-116D, and making any additional attachments needed to secure and stabilize the fixture of the top plate assembly 104 onto the base 104. For example, the rest points 114A-114D and the support points 116A-116D may be designed so as to be secured with clamps or screws. Once the connection is made, the scanner base 102 may be initialized and establish communication with the top plate assembly 104. Such establishment of communication may be accomplished by interrogation by the top plate assembly control and communication module 308 of each of the interfaces 310, 312, 314 and 316, the wireless power interface 128, and the connection provided by the contact between the rest point 114D and the support point 116D, in order to detect a top plate assembly identification signal. Once an identification signal has been detected, the top plate assembly control and communication module 308 may select the appropriate interface or connection for communication and may deactivate, or simply ignore signals from, the other interfaces.

A plurality of interfaces 310, 312 and 314 and 316 are shown here as being simultaneously deployed and automatically selected for use. However, it will be recognized that a scanner base such as the scanner base 102 may be designed with only one type of interface. It will also be recognized that in cases of multiple possible interfaces, selection need not be made by querying the different interfaces for an identification signal, but instead may be made in any of a variety of other ways. For example, initialization software may be run on a terminal connected to the scanner 100 whenever a top plate assembly is installed or changed, with the installation software allowing specification of the top plate assembly being installed.

It will also be recognized that the scanner base 102 may accommodate a top plate assembly with no scale mechanism. In many scanner installations, all goods are individually priced and will not be sold by weight. In such cases, a user does not need to pay for a scanner with scale capabilities. In such installations, a scanner without scale capabilities may be furnished simply by providing a scanner base such as the scanner base 102 together with a top plate assembly with no scale mechanism or accompanying electronics. If a scanner base such as the scanner base 102 is used, having various elements to accommodate and communicate with a scale mechanism, the top plate assembly control and communication module 308 may take appropriate action upon failure to receive an identification signal upon response to a query. Such action may include, for example, presenting a query to an operator for display by a terminal connected to the scanner 100, requesting confirmation that the installed top plate assembly has no scale capabilities. It will also be recognized that a scanner base similar to the scanner base 102 may be furnished, but without the hardware needed to accommodate and communicate with a scale mechanism. The scanner base 102 may be designed such that the elements such as the top plate assembly control and communication interface 118, the power transmission interface 128 and the wireless communication interface 130 are removable modular elements, so that a scanner base may be supplied without these elements to save costs if they are not needed.

Figure 4:
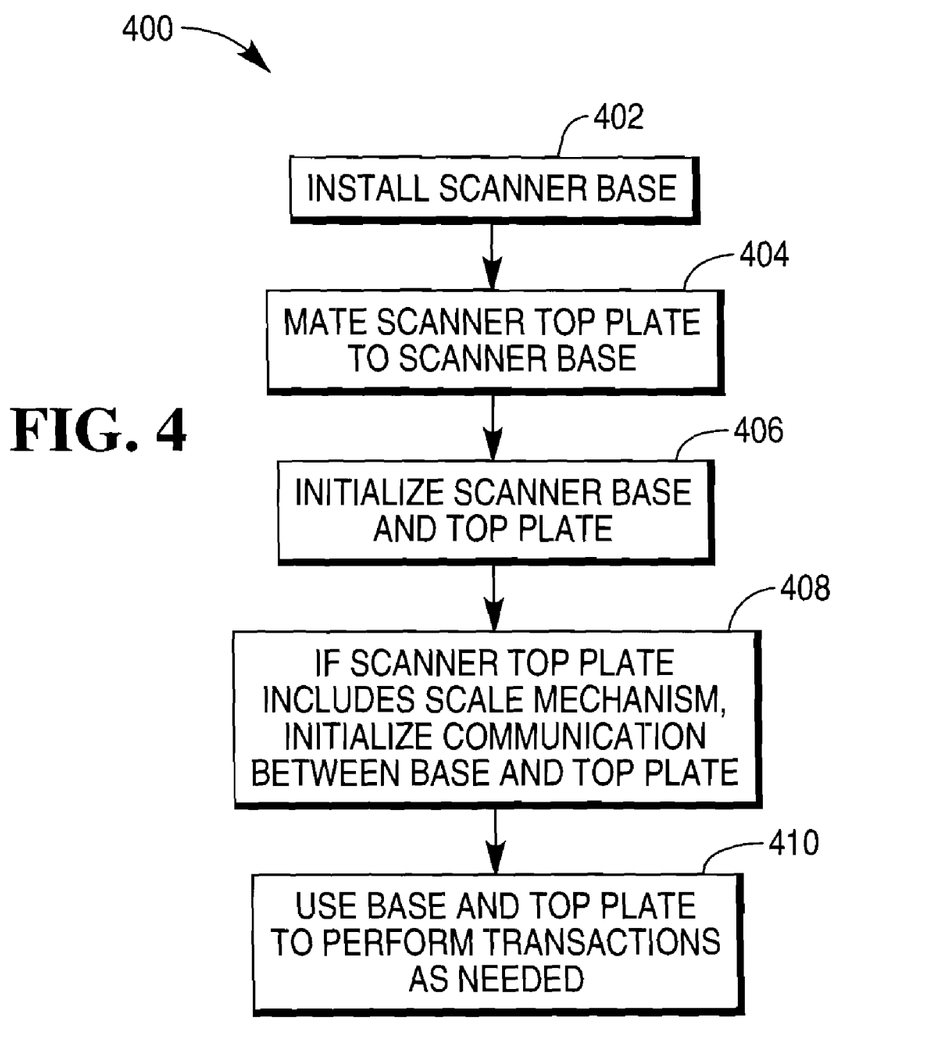
FIG. 4 illustrates a process of scanner assembly and use according to an aspect of the present invention.

FIG. 4 illustrates a process 400 of scanner installation and use according to an aspect of the present invention. At step 402, a scanner base is installed. The scanner base is suitably similar to the base 102 of FIGS. 1 and 3. At step 404, a scanner top plate assembly is mated to the scanner base. The scanner top plate assembly may be similar to the top plate assembly 104 of FIGS. 1 and 2, including a scale mechanism, but may alternatively be a simple plate with a scan window, lacking a scale mechanism. At step 406, the scanner base and top plate assembly are initialized, with the type of scanner top plate assembly being automatically or manually identified to the scanner base. At step 408, if the scanner top plate assembly includes a scale mechanism, communication between the scanner base and the scanner top plate assembly is initialized so as to permit the scanner base to receive and interpret weight readings from the scanner top plate assembly. At step 410, the scanner base and scanner top plate assembly are operated as needed to provide data for use in transactions as needed, with operational choices being made based in part of the type of top plate assembly identified on initialization. For example, depending on the type of top plate assembly identified, communication may be performed through a wired connection or through an appropriate wireless interface compatible with a wireless interface used by the top plate assembly.

While the present invention is disclosed in the context of a presently preferred embodiment, it will be recognized that a wide variety of implementations may be employed by persons of ordinary skill in the art consistent with the above discussion and the claims which follow below.

I claim:

1. A top plate assembly for a bar code scanner, comprising:
   a generally planar top plate;
   a scale mechanism disposed within the top plate assembly;
   a plurality of rest points for mating the top plate assembly to a scanner base; and
   an interface for communicating a weight reading from the scale mechanism to a scanner base mated with the top plate assembly.

2. The top plate assembly of claim 1, wherein the interface communicates the weight reading to the scanner base without exerting a weight influence on the scale mechanism.

3. The top plate assembly of claim 2, wherein the interface is a wireless interface.

4. The top plate assembly of claim 2, wherein the interface is a contact between one of the rest points and a corresponding support point of the scanner base.

5. The top plate assembly of claim 2, further comprising a power element for powering active elements within the top plate assembly.

6. The top plate assembly of claim 5, wherein the power element receives power from an interface between a rest point on the scanner top plate assembly and a corresponding support point on the scanner base.

7. The top plate assembly of claim 5, wherein the power element is a solar cell.

8. The top plate assembly of claim 5, wherein the power element receives power through a magnetic inductive coupling with a corresponding element in the scanner base.

9. The top plate assembly of claim 8, further comprising a communication interface and wherein the scanner top plate assembly receives power and conducts communication through the magnetic inductive coupling with the scanner base.

10. The top plate assembly of claim 2, further comprising a scale support unit for managing communication between the scanner top plate assembly and the scanner base, the scale support unit being operative to provide an identification of a scanner top plate assembly type to the scanner base upon initialization of the scanner top plate assembly and the scanner base.

11. A scanner base, comprising:
   a housing;
   a plurality of support points for mating the scanner base to a top plate assembly; and
   an interface for receiving a weight reading from a scale mechanism in the top plate assembly.

12. The scanner base of claim 11, wherein the interface comprises a contact between one of the support points and a corresponding rest point on the scanner top plate assembly.

13. The scanner base of claim 11, wherein the interface is a wireless communication interface.

14. The scanner base of claim 11, further comprising a power interface for supplying power to the scanner top plate assembly.

15. The scanner base of claim 14, wherein the power interface comprises a contact between one of the support points and a corresponding rest point on the scanner top plate assembly.

16. The scanner base of claim 14, wherein the power interface comprises a magnetic coupling to a corresponding power element in the scanner top plate assembly.

17. The scanner base of claim 16, wherein the power interface also serves as the wireless communication interface and provides communication through a magnetic coupling with a corresponding element in the scanner top plate assembly.

18. A method of transaction processing, comprising the steps of:
   coupling a scanner base to a scanner top plate assembly having an integrated scale mechanism; and
   initializing the scanner base and the top plate assembly to establish communication of weight readings from the scanner top plate assembly to the scanner base.

19. The method of claim 18, wherein the step of initializing the scanner base and the top plate assembly includes providing an identification of a type of the scanner top plate assembly to the scanner base.

20. The method of claim 19, further comprising a step of using the scanner base and the top plate assembly to conduct transactions, with operational choices being made depending on the identification of the type of the scanner top plate assembly.

* * * * *